United States Patent [19]

Woodrow

[11] Patent Number: 4,825,927
[45] Date of Patent: May 2, 1989

[54] CONTROLLED SHADING DEVICE

[76] Inventor: Arthur F. Woodrow, 6501 E. Grant Rd., Tucson, Ariz. 85715

[21] Appl. No.: 134,772

[22] Filed: Dec. 18, 1987

Related U.S. Application Data

[63] Continuation-in-part of Ser. No. 116,689, Nov. 4, 1987.

[51] Int. Cl.[4] ............................................. E05F 15/20
[52] U.S. Cl. ......................................... 160/1; 52/174; 414/231; 414/232; 414/227
[58] Field of Search ................. 160/1, 2, 7, 10; 52/174; 414/231, 232, 252, 227, 228

[56] References Cited

U.S. PATENT DOCUMENTS

| | | | |
|---|---|---|---|
| 1,719,055 | 7/1929 | Herzer . | |
| 2,751,977 | 6/1956 | Pinkerton . | |
| 2,869,562 | 1/1959 | Francis | 160/370.2 X |
| 2,878,998 | 3/1959 | Spencer | 414/228 X |
| 3,004,301 | 10/1961 | Francis | 160/370.2 X |
| 3,060,519 | 10/1962 | Francis | 160/370.2 X |
| 3,463,174 | 8/1969 | Heller . | |
| 3,481,073 | 12/1969 | Yoshida et al. | 160/2 X |
| 3,872,911 | 3/1975 | Janes | 160/1 |
| 4,128,307 | 12/1978 | Badertscher et al. | 160/167 X |

Primary Examiner—Robert W. Gibson, Jr.
Assistant Examiner—David M. Purol
Attorney, Agent, or Firm—Mark E. Ogram

[57] ABSTRACT

A device for controlling access to a shaded parking area. In the invention, a parking space is provided with shade. Access to the shade is controlled by a meter in combination with a removable barrier. When the user gains access by insertion of a "credit card", the time of entry is noted together with the later time of exit. The elapsed time is used to compute the amount of charge to the user.

14 Claims, 3 Drawing Sheets

CONTROLLED SHADING DEVICE

BACKGROUND

This is a continuation-in-part from United States Patent application Ser. No. 116,689, filed Nov. 2, 1987, and entitled "Metered Shade".

This invention relates generally to metered parking spaces and more particularly to spaces which provide additional services.

In many parts of the country, particularly in the Southwest, protection from the elements is very important. Should the vehicle be exposed to direct sunshine, the interior of the vehicle can heat to temperatures of well over 130 degrees fahrenheit. This temperature can be obtained in only a few minutes.

Once so heated, driving the vehicle becomes extremely uncomfortable. Even with the aid of refrigeration, it takes up to half an hour to bring the temperature of the vehicle down to an acceptable level.

The intense temperature can kill plants, ruin groceries, kill or incapacitate pets, people and children, cause volatile liquids to explode, damage the upholstery of the vehicle, crack the leather, vinyl or wood, and fade materials. Metal parts within the automobile such as seat belt buckles and steering wheels, become so hot that they cannot be touched by the operator.

Additionally the high temperature can have catastrophic affects upon items left within the vehicle and even the vehicle itself. Magnetic tapes and photographic film which are left within the vehicle can be destroyed by the intense temperature. As vehicles start to use more electronics, very high and sustained temperatures can jeopardize their integrity.

The problem of overheating of the vehicle and its protection has existed almost from the day of the first motor-vehicle. As far back as 1927 U.S. Pat. No. 1,719,055 entiteld "Combination Bumper, Container, Tent, and Car Cover" was issued to Herzer on a shade which was transported with the vehicle. Similar other United States patents were issued on this approach to the problem such as U.S. Pat. No. 2,751,977 entitled "One Man Automobile Cover" issued to Pinkerton on June 26, 1956 and U.S. Pat. No. 3,463,174 entitled "Portable Cover Structure" issued to Heller on Aug. 26, 1969.

In each of these instances, the operator must manually drape or form a frame of fabric material over the vehicle. Because of their nature, these approaches are susceptible to the elements such as wind and rain. Draping of the material so that it contacts the vehicle, exposes the paint of the vehicle to wear as even a minor breeze moves the fabric. The devices are also very restraining to the vehicle making it difficult to obtain access to the vehicle without removing the shelter itself.

In another attempt to solve the heating and exposure problem, many businesses have constructed permanent shades for use by their employees or customers. Although this does provide protection, the quick shopper who only needs protection for a short period of less than an hour, is not usually provided any protection. As noted earlier, even this short time can substantially increase the temperature within the vehicle.

The main reason for the lapse in providing protection, is the cost associated with the construction of a permanent structure. Most businesses cannot afford to provide this service for their customers.

Another solution which has been used is the placement of cardboard screens on the inside of the vehicle behind the front windshield. Although this does provide some protection, the cardboard screen is merely trapping the hot air inside the vehicle. The ultraviolet rays still enter the vehicle's front windshield (no protection is provided for windows other than the windshield) and heats the vehicle in the same manner.

Window tinting has also been done. In this approach, a film which is resistant to ultraviolet rays is applied to the windows of the vehicle. Although this does provide some relief, the interior of the vehicle is darkened for normal driving. To many users, this is not desirable.

As is readily apparent, there doesn't exist any acceptable solutions for this problem.

SUMMARY OF THE INVENTION

In the present invention, the shading of the targeted space, or parking space, is controlled according to time. The mechanism provides shade for the space only when the user has paid for the service. In this manner, the cost of the shade's construction is borne by the user and not the establishment where the shade is located.

In the preferred embodiment of the invention, a meter is placed in the locale of the parking space. The user deposits the correct amount of change, or alternatively charges it to a credit card, and the mechanism unfurls a shade over the parking space. This shade is left unfurled until either the time has elapsed based upon the amount paid, or the vehicle vacates the parking space.

Identifying when a vehicle vacates the parking space is accomplished by any type of presence sensor known to those of ordinary skill in the art. This includes magnetic sensors which are embedded in the parking space itself, electronic beams criss-crossing the parking space, or a sonic sensor.

By identifying when a vehicle has vacated the spot, and then removing the shade from the parking spot, the device has performed its primary duty and provided shade for the paying customer; additionally, the removal of the shade does not encourage a non-paying customer to take advantage of whatever shade time is still available. To obtain the shade, the customer must pay.

Many different embodiments exist for the creation of the shade itself. Included are louvered slats which are lowered when activated, a sweep arm which extends over the parking space, and others which are obvious to those of ordinary skill in the art.

The preferred embodiment is a frame which supports a fabric material which, when activated, is extended, via the frame, to cover the targeted area. The fabric material is either solid and translucent, or a webbing arrangement. The webbing arrangement has the added ability that it will not catch and contain rain and thereby become overburden by the precipitation. Should a solid fabric be utilized, additional supports and an angling of the shade to shed the precipitation is necessary.

The metered aspect of the invention is important since it transferes the cost of the construction to the user of the shade. Although in the preferred embodiment of the invention, the meter is positioned at the site of the shade, another embodiment of the invention places the meter at a central location such as a recreational vehicle park's central office. The recreational vehicle owner, when renting a parking space specifies if he desires shade for his vehicle. If so, the park's operator activates the meter for the appropriate space. In this example, the meter may operate for days or even months and is not deactivated should the vehicle leave the space.

Although in the preferred embodiment of the invention the meter is capable of accepting change, those of ordinary skill in the art recognize that other type of meters are available such as paper money activated, credit cards activated, and the like.

In an alternative embodiment of the invention, the shade is provided constantly, it is the user's access to the shade which is controlled. In this embodiment, some barrier is used to selectively permit/bar entry of a user's vehicle into the shaded area. Although this barrier may block total access to the parking space, in one embodiment of the invention, only a portion of the space sufficient to not permit total shading of the vehicle, is restrained.

To use this embodiment of the invention, the user inserts a credit card into a card reader which notes the time of entry and removes the barrier. The user parks his vehicle. When ready to leave, again the user inserts the credit card which removes the barrier to permit the vehicle to leave. This insertion and vacating of the parking space determines the exit time of the vehicle so that proper financial accounting may be made.

An alternative to the use of the credit card during the vacating process is the use of a presence detector as described before. The user simply vacates the parking space and his exit time is automatically noted.

Still another possible user input device is the use of a radio control which communicates with a radio receive in a similar manner as a garage door opener. Because of the special coding of each transmitter, the receiver knows which user is to be billed for the use of the parking space. This embodiment permits several users to have access to a bank of parking spaces and to have a central controller control access to any parking space within the bank.

In operation, the user drives the vehicle toward the bank of spaces and activates the radio transmitter. The central controller selects one of the spaces which is currently vacant and removes the barrier, thereby permitting the user to park the vehicle.

Various examples of barriers are obvious to those of ordinary skill in the art including tire jabs, swing arm barriers, and others. The key to the barrier is its restraint of user access to the full utility of the parking space and its associated shelter.

Although the present discussion has used the vehicle parking space as its illustration, those of ordinary skill in the art readily recognize that the invention's capability extends to any area where shade is provided for a targeted area based upon the use of a meter. This would include a shade provided for a picnic area, stadium, boats, airplanes, etc.

The invention, together with its various embodiments will be more fully described by the following drawings and their accompanying descriptions.

DRAWINGS IN BRIEF

Figures 4A, 4B, 4C:
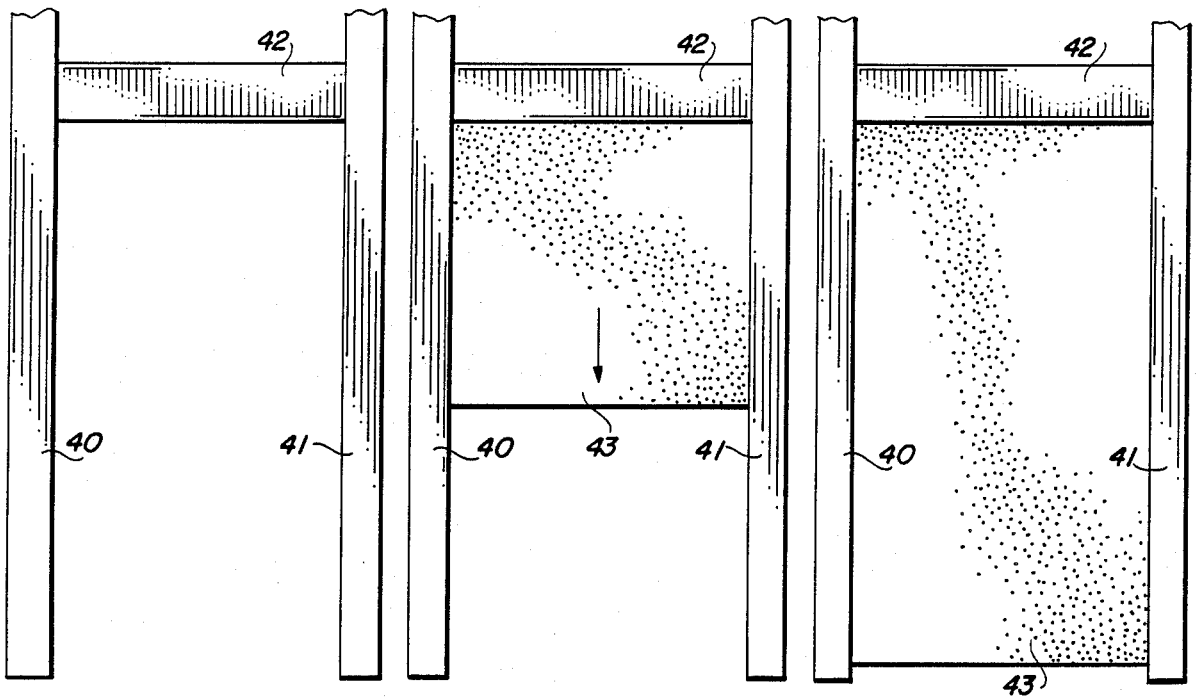

FIGS. 4a, 4b, and 4c are top views of an embodiment of the invention during three phases of operation.

Figure 5A:
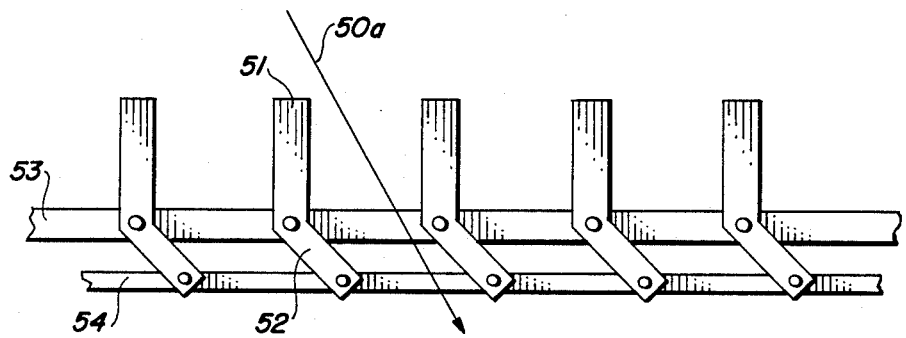
Figure 5B:
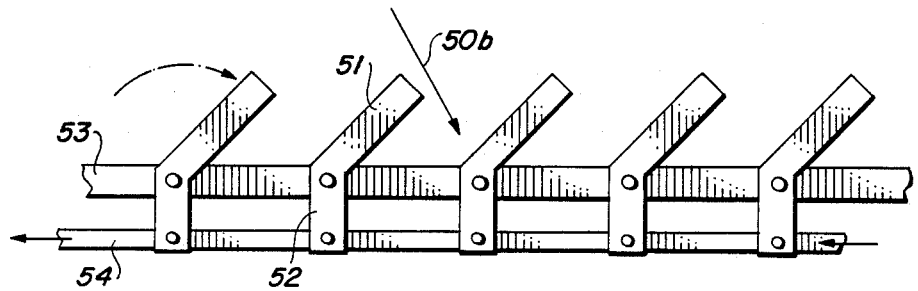

FIGS. 5a and 5b are side views of an embodiment of the shading arrangement using louvers for the shading mechanism.

Figure 6A:
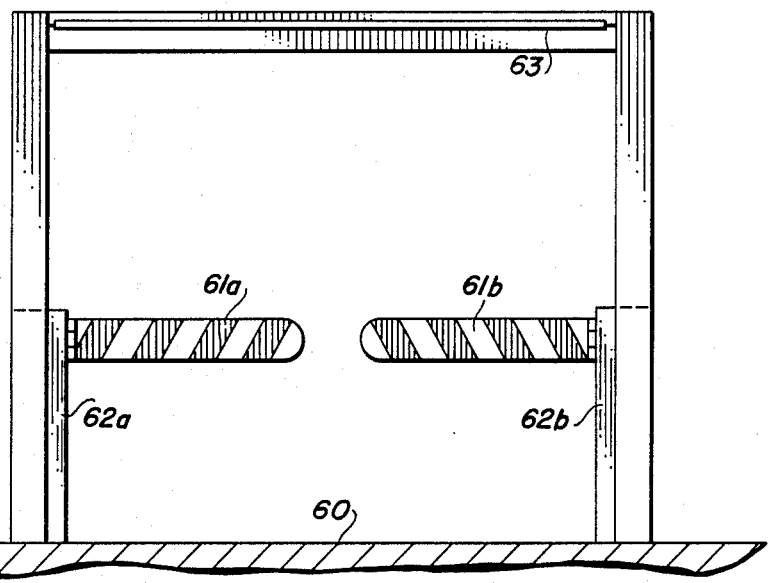
Figure 6B:
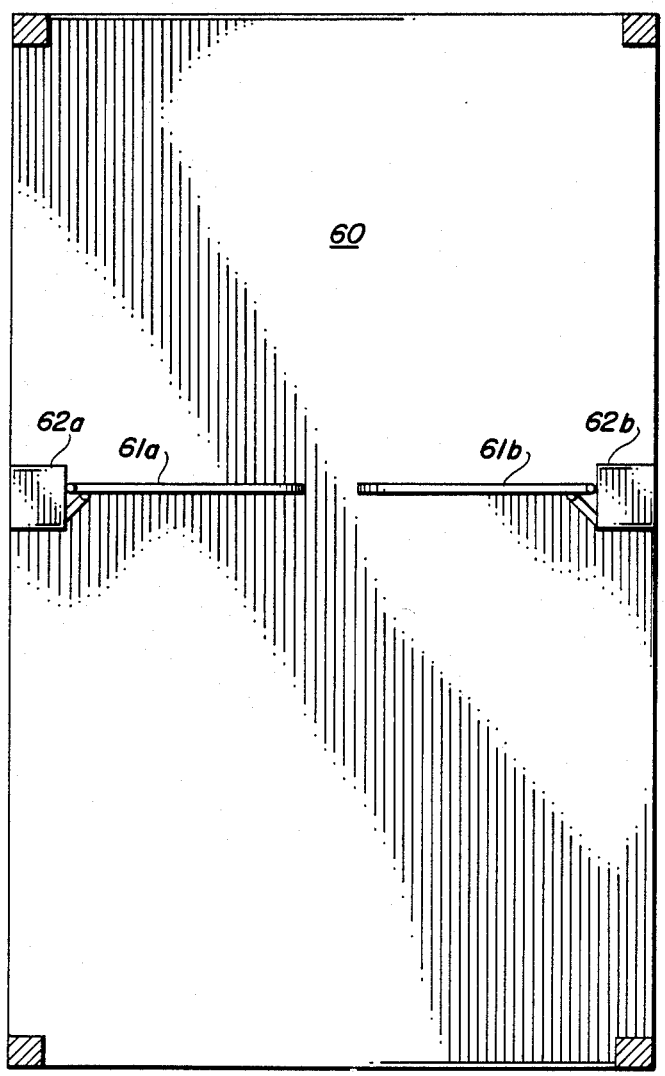

FIGS. 6a and 6b illustrate an embodiment of the invention which utilizes a barrier to control access to the parking space.

DRAWINGS IN DETAIL

Figure 1:
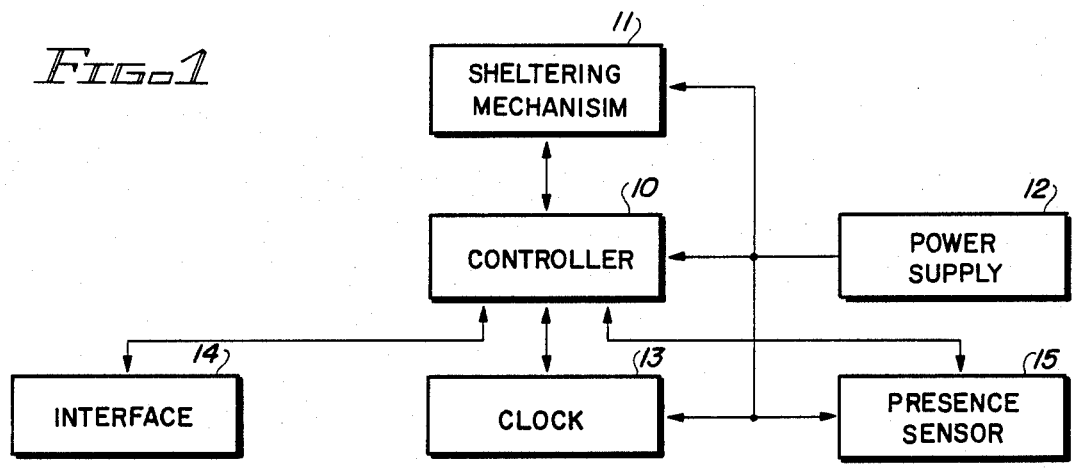
FIG. 1 is a block diagram of the operation of the preferred embodiment.

In FIG. 1, controller 10 acts as the central control unit for this preferred embodiment. Interface 14 provides information to controller 10 as to the user's desires. This includes information on the amount of money either deposited or charged to a credit card. Data from clock 13 assists controller 10 in determining when the allotted time has elapsed.

Shade for the parking space or targeted area is provided by the sheltering mechanism 11 as directed by the controller 10. A feed back system from sheltering mechanism 11 to controller 10 permits the controller to know the state of the sheltering mechanism 11 (i.e. shade provided, shade not provided, shade being extended, shade being withdrawn).

In the preferred embodiment of the invention, a short time is permitted to pass before data from the presence sensor 15 is consulted. This passing of time permits the vehicle to be parked in the space. Thereafter, controller 10 monitors the clock 13 and the presence sensor 15 to determine if the sheltering mechanism 11 should be instructed to withdraw the shade. As noted earlier, the shade is withdrawn when either the time allotment has elapsed or the vehicle is removed from the parking space or targeted area.

Power supply 12 provides power for all of the different functions of this preferred embodiment. In the embodiment power supply 12 is connected to the public utilities but other embodiments are obvious to those of ordinary skill in the art such as photo-voltaic cells with battery storage.

FIG. 1 illustrates a fully self-contained unit which provides shade. Because of its structure, only users with a need for shade will operate the device and obtain its benefits; should a party not want to obtain the shade, he is not forced to pay for it.

Figure 2:
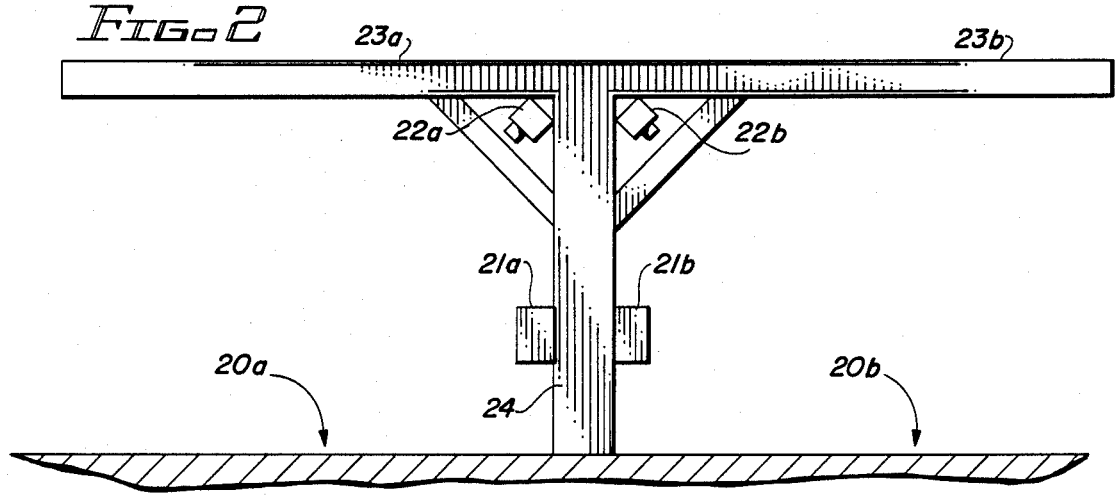
FIG. 2 is a cross sectional view of an embodiment of the invention.

FIG. 2 is a cross sectional view of an embodiment of the invention. In this embodiment of the invention, there are two targeted areas, 20a and 2-b. Frame 24 has arms 23a and 23b extending over the targeted areas 20a and 20b respectively.

Meter 21a contains the controller which manipulates the shade (not shown) which is extended over the targeted area 20a via arm 23a. Sensor 22a communicates the existence of a vehicle in targeted area 20a to the controller within the meter 21a. Meter 21b, sensor 22b, and arm 23b operate in a similar manner.

Whereas arms 23a and 23b are substantially parallel to the level of the ground of the targeted areas 20a and 20b respectively, if a solid fabric material is used for the shading substance, the preferred mode is to have arms 23a and 23b slope away from frame 24 so that precipitation is directed away and does not collect on the solid fabric material.

Figure 3A:
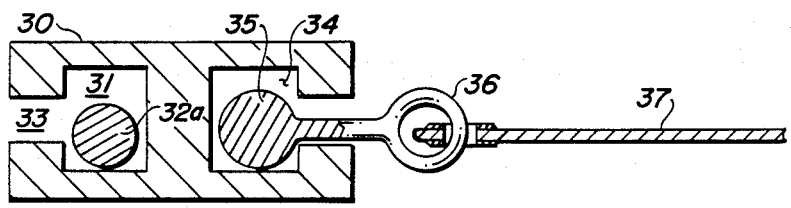
FIGS. 3a and 3b illustrate the support frame for the preferred embodiment of the invention.
Figure 3B:
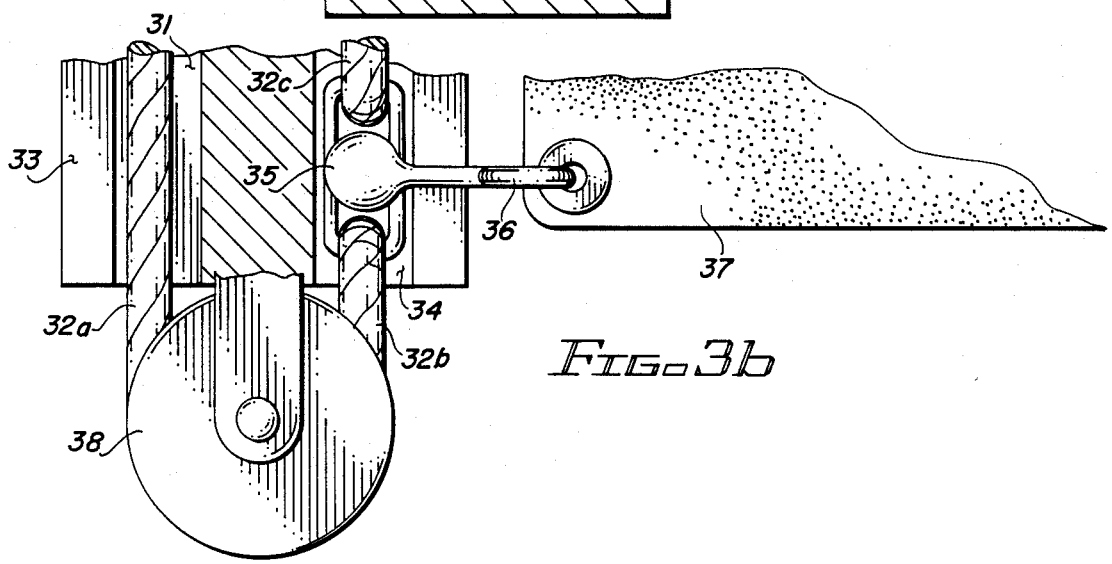

FIGS. 3a and 3b further illustrate the arms and their workings first illustrated in FIG. 2.

FIG. 3a is a cut-away view of the preferred embodiment of the frame which supports the shading material. Frame 30 has two grooves 31 and 34. Within groove 31 lies cable 32a. Opening 33 permits ready inspection of cable 32a and allows easy installation of the cable.

Groove 34 lies on the shading side of frame 30. Holder 35 nests in groove 34. Holder 35 also has retaining ring 36 which attaches to the fabric material 37.

Referring to FIG. 3b, cable 32a passes around pulley 38. The cable 32b within groove 34 attaches to holder 35. Cable 32c attaches to holder 35 and also to the next holder (not shown) within groove 34. As cable 32a is withdrawn, holder 35 is moved along groove 34. In similar manner, as the cable 32c is withdrawn, so is the shade 37.

FIGS. 4a, 4b, and 4c are sequential top views of an embodiment of the invention.

In FIG. 4a, the shading fabric is fully contained within its housing 42. Frame arms 40 and 41 are positioned to support the shading fabric 43 as it is unfurled in FIG. 4b. Once fully extended, the shading fabric 43 extends substantially to the ends of frame arms 40 and 41.

FIGS. 5a and 5b are side views of an embodiment of the invention which utilizes moveable slats to create the shade for the targeted area.

In FIG. 5a, sunlight 50a is at an angle such that slats 51 do not block it from passing through to the targeted area. Each slat 51 is pinned to slide member 53 and slide member 54.

In FIG. 5b, slide member 54 is moved relative to slide member 53, Because of the angle of footing 52, slats 51 are rotated so that the sunlight 50b does not pass through to the targeted area.

In this embodiment of the invention, slats 51 are designed not to come in contact with each other. This permits precipitation and dirt to fall through and not cause undue weight to the structure.

FIG. 6a is a frontal view of an embodiment of the invention which utilizes barriers to control access to the parking space. FIG. 6b is a cutaway top view of the same embodiment.

In FIG. 6a, the parking platform 60 has two support mechanisms 62a and 62b for shade 63. Additionally, the supports 62a and 62b house the mechanism for controlling barrier arms 61a and 61b. In this embodiment of the invention, radio frequency transmitters are used to gain access to the parking space. The receiver for the radio frequencies as well as the controller for the system is housed in support 62a (not shown).

The controller for the system (not shown) meters the time which is used by the operator through the use of a presence sensor housed in support 62b (not shown). When the vehicle vacates the platform 60, the time is noted and used in creating an accounting for the user.

As can be seen in FIG. 6b, in this embodiment supports 62a and 62b are located substantially at the center of the parking space 60. This permits the supports to be positioned in a convenient position for parking, but at a spot so that barrier arms 61a and 61b can prevent a vehicle from totally entering platform 60.

It is clear from the foregoing that the present invention provides a mechanism to address the problems of the past by creating a metered shade.

What is claimed is:

1. A parking system for use at a single vehicle parking space comprising:
   A. protection means providing weather protection for said vehicle parking space;
   B. barrier means for selectively preventing a vehicle full access to said vehicle parking space; and,
   C. control means having:
      1. clock means;
      2. accounting means for receipt of user payment;
      3. means for determining when a vehicle is located within said vehicle parking space; and
      4. activation means for,
         a. determining if the accounting means has been activated by a user;
         b. manipulating said barrier means to permit a user vehicle access to said vehicle parking space;
         c. periodically determining, via said means for determining, if said vehicle has vacated said parking space; and,
         d. establishing the total elapsed time from said clock means upon the vacating of the parking space by the user vehicle.

2. The parking system according to claim 1 wherein said activation means further includes means for billing the user based upon the total elapsed time.

3. The parking system according to claim 2 wherein said activation means further includes means for manipulating said barrier means to prevent a user vehicle access to said vehicle parking space once the user vehicle has vacated said vehicle parking space.

4. The parking system according to claim 2 further comprising means for securing said user vehicle within said vehicle parking space and wherein said activation means includes means for manipulating said means for securing once the user vehicle is within said vehicle parking space.

5. The parking system according to claim 2 further comprising a user interface means for receipt of user generated data indicative of the user's desire to vacate the vehicle parking space.

6. The parking system according to claim 2 wherein said accounting means includes means for recordation of a user's credit card number.

7. An automated parking monitor for a single parking space comprising:
   A. means for providing weather shelter to said parking space;
   B. means for receipt of indicia representative of a user's desire to utilize said parking space; and,
   C. means for controlling access to said parking space, said means being responsive to said indicia.

8. The automated parking monitor according to claim 7 further comprising means for accounting for time used for said user, said means for accounting being triggered by said indicia.

9. The automated parking monitor according to claim 8 wherein said means for receipt includes a credit card reader.

10. The automated parking monitor according to claim 8 wherein said means for receipt includes a radio frequency receiver and further comprising means for transmission of a radio frequency by the user.

11. An parking system comprising:
    A. a plurality of parking location, each location having,
       1. a platform suitable for parking a vehicle;
       2. a weather shelter for providing shelter to said platform, and,
       3. barrier means for selectively preventing access to said platform; and,
    B. control means being responsive to user generated indicia and for selectively removing one of said barrier means to permit entry onto said platform.

12. The parking system according to claim 11 wherein said control means further includes means for identifying said user based upon the user generated indicia.

13. The parking system according to claim 12 wherein said control means further includes means for establishing an accounting based upon the users utilization of said platform.

14. The parking system according to claim 13 wherein said user generated indicia includes a radio frequency transmission.

* * * * *